(12) United States Patent
Shigenaka et al.

(10) Patent No.: US 7,122,798 B2
(45) Date of Patent: Oct. 17, 2006

(54) INFRARED IMAGE SENSOR

(75) Inventors: Keitaro Shigenaka, Hachioji (JP); Yoshinori Iida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 10/753,386

(22) Filed: Jan. 9, 2004

(65) Prior Publication Data

US 2004/0159788 A1    Aug. 19, 2004

(30) Foreign Application Priority Data

Feb. 13, 2003   (JP)   ............... 2003-035570

(51) Int. Cl.
*G01J 5/00* (2006.01)
(52) U.S. Cl. ............... 250/338.1; 250/336.1
(58) Field of Classification Search ............. 250/336.1, 250/338.1
See application file for complete search history.

(56) References Cited

U.S. PATENT DOCUMENTS 6,028,309 A * 2/2000 Parrish et al. ............... 250/332
2004/0099920 A1* 5/2004 Rossi et al. ................. 257/448

FOREIGN PATENT DOCUMENTS

| JP | 05172635 A | * | 7/1993 |
| JP | 7-35619 | | 2/1995 |
| JP | 9-284561 | | 10/1997 |
| JP | 9-284651 | | 10/1997 |
| JP | 10-318843 | | 12/1998 |
| JP | 2002-286552 | | 10/2002 |
| JP | 2002-310783 | | 10/2002 |

OTHER PUBLICATIONS

U.S. Appl. No. 10/106,787, filed Mar. 27, 2002, Iida et al.

* cited by examiner

*Primary Examiner*—David Porta
*Assistant Examiner*—Christine Sung
(74) *Attorney, Agent, or Firm*—Oblon, Spivak, McClelland, Maier & Neustadt, P.C.

(57) ABSTRACT

An infrared image sensor comprises, a substrate having an image area on which infrared radiation is made incident and an non-image area out of the image area, plural first heat-sensitive parts arranged in rows and columns on the image area, plural second heat-sensitive parts provided in the non-image area so as to correspond to the respective rows of the first heat-sensitive parts in the image area with the same thermoelectric conversion function as that of the first heat-sensitive parts, a bias current supply circuit supplying a bias current to the first heat-sensitive parts and second heat-sensitive parts, an output circuit outputting an electric signal of the first heat-sensitive parts, and a bias current control circuit controlling the bias current to be fed to the first heat-sensitive parts, according to an electric signal of the second heat-sensitive parts.

19 Claims, 3 Drawing Sheets

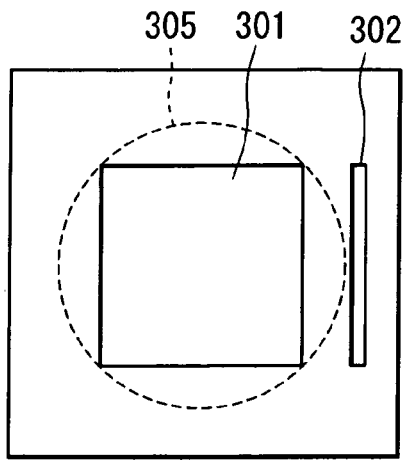
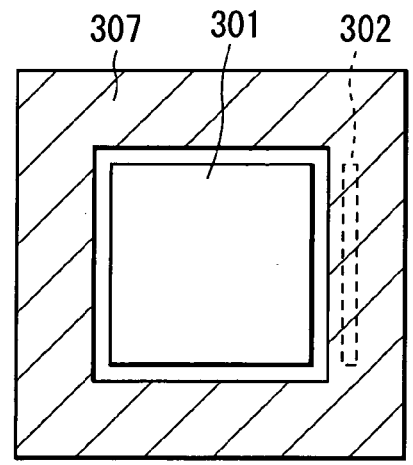
FIG. 4       FIG. 5
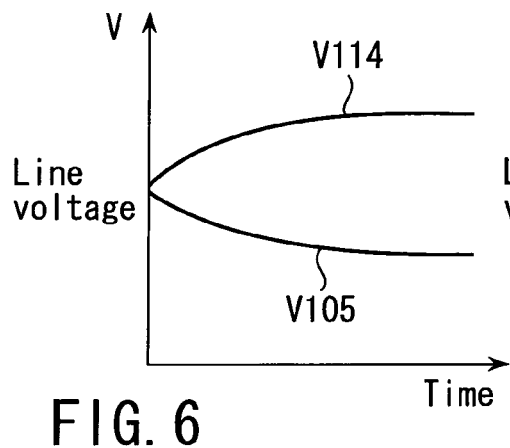
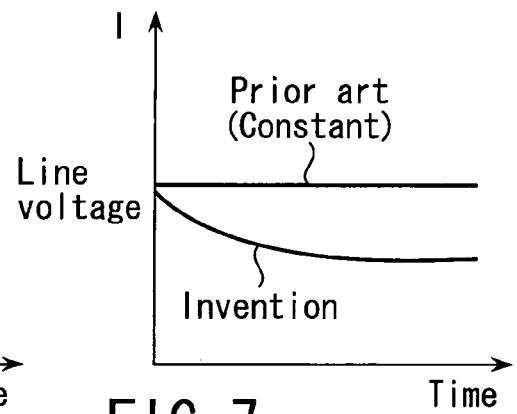
FIG. 6       FIG. 7
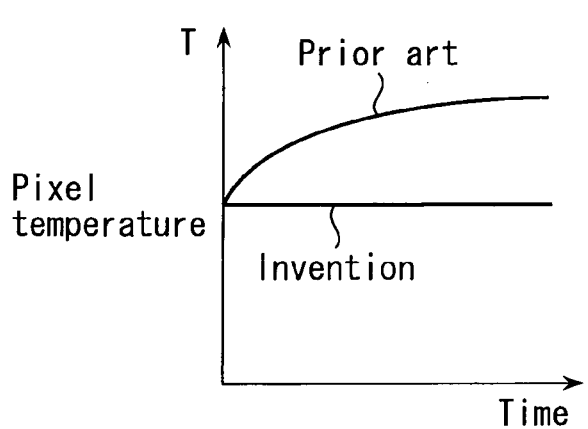
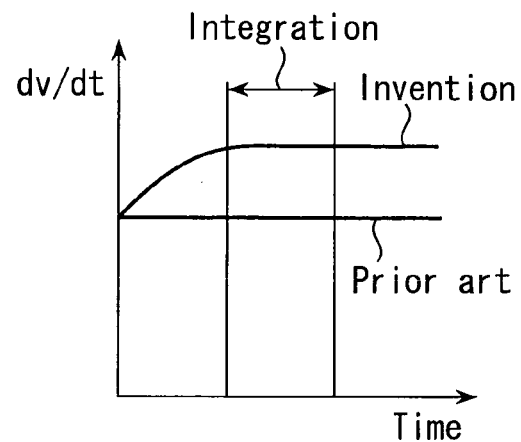
FIG. 8       FIG. 10

INFRARED IMAGE SENSOR

CROSS-REFERENCE TO RELATED APPLICATIONS

This application is based upon and claims the benefit of priority from the prior Japanese Patent Application No. 2003-035570, filed Feb. 13, 2003, the entire contents of which are incorporated herein by reference.

BACKGROUND OF THE INVENTION

1. Field of the Invention

The present invention relates to a non-cooled infrared image sensor requiring no cooling device, in particular, an infrared image sensor adopting a method of reading a signal by the passage of a bias current.

2. Description of the Related Art

Recently, as thermal infrared image sensors which need no cooling devices, infrared image sensors of vanadium oxide bolometer type and BST (Barium-Strontium-Titanate) pyroelectric type have been commercialized. These products comprise heat-sensitive parts which absorb infrared radiation and raise the temperature thereof, support legs for thermally separating the heat-sensitive parts from a silicon substrate, and horizontal address lines and vertical signal lines and the like for selecting pixels formed of the heat-sensitive parts. Each heat-sensitive part absorbs infrared radiation from a subject, and the rise in the temperature of the heat-sensitive part in absorption is sensed on the basis of change in the resistance or capacitance. Therefore, the support legs supporting the heat-sensitive part are configured to have a small cross section and a long length, to enhance their heat-insulating effects.

Among the products, in the method called "bolometer type" in which the rise in the temperature of the heat-sensitive part is detected on the basis of change in resistance, a bias current is fed for a certain period of time, to accumulate (integrate) signals by infrared radiation. Therefore, during the signal accumulating period, the heat-sensitive parts are heated by Joule heat generated by the bias current. The rise in the temperature caused by the Joule heat is greater than the rise in the temperature caused by absorption of infrared radiation from the subject, thus most of signals from the heat-sensitive parts is occupied by noise generated by the Joule heat. To cancel the noise, there have been proposed a method, in which an integrator circuit is provided for each column and charge for noise generated by Joule heat is removed through a reference resistor, and the like (for example, please refer to Jpn. Pat. Appln. KOKAI Pub. No. 9-284651).

However, such methods have the following problem. Specifically, the above canceling mechanism does not work, in the case where the temperature of the package on which the chip is mounted has changed, in particular, in the case where the temperature of the chip rapidly changes, such as directly after start of driving the chip. Further, much heat is radiated from the whole heat-sensitive parts, and contributes to change in the temperature of the chip.

As described above, in conventional thermal infrared image sensors, it is difficult to remove noise components generated by Joule heat in the case where the temperature of the chip rapidly changes, and this is a main cause of lowering the reliability of the sensors. Therefore, it has been desired to realize an infrared image sensor which is inexpensive and highly reliable and can effectively remove noise components accompanied by change in the temperature of the chip.

BRIEF SUMMARY OF THE INVENTION

According to the first aspect of the present invention, an infrared image sensor comprises:

a substrate having an image area on which infrared radiation is made incident, and a non-image area out of the image area;

a plurality of first heat-sensitive parts arranged in columns and rows on the image area of the substrate, each of the plurality of the first heat-sensitive parts having a thermoelectric conversion function of converting a temperature into an electric signal in the state where a bias current is applied thereto, and a structure of absorbing the infrared radiation;

a plurality of second heat-sensitive parts provided in the non-image area of the substrate, the plurality of second heat-sensitive parts provided to correspond to the respective rows and having the same thermoelectric conversion function as that of the first heat-sensitive parts;

a bias current supply circuit which supplies the bias current to the first heat-sensitive parts and the second heat-sensitive parts;

an output circuit which outputs the electric signal of the first heat-sensitive parts; and a bias current control circuit which controls the bias current to be fed to the first heat-sensitive parts, according to an electric signal of the second heat-sensitive parts.

According to the second aspect of the present invention, an infrared image sensor comprises:

a substrate having an image area on which infrared radiation is made incident, and an non-image area out of the image area;

a plurality of first heat-sensitive parts arranged in columns and rows on the image area of the substrate, each of the plurality of the first heat-sensitive parts having a thermoelectric conversion function of converting a temperature into an electric signal in the state where a bias current is applied thereto, and a structure of absorbing the infrared radiation;

a plurality of second heat-sensitive parts provided in the non-image area of the substrate, the plurality of second heat-sensitive parts provided to correspond to the respective rows and having the same thermoelectric conversion function as that of the first heat-sensitive parts;

a plurality of address lines arranged for the respective rows, and connected to the first heat-sensitive parts and the second heat-sensitive parts in the same respective rows;

a plurality of first signal lines arranged for the respective columns, and connected to the first heat-sensitive parts in the same respective columns;

a second signal line connected to the second heat-sensitive parts;

a bias current supply circuit which successively applies a fixed bias voltage to the address lines, and selectively supplies a fixed bias current to the first heat-sensitive parts and the second heat-sensitive parts;

an output circuit which outputs a voltage generated on the first signal lines in the image area as a result of supplying the bias current; and a control circuit which controls the bias current supplied to the first heat-sensitive parts in the image area, on the basis of a voltage generated on the second signal line in the non-image area as a result of supplying the bias current, and suppresses change in a detection signal caused by a rise in temperature of the first heat-sensitive parts due to the bias current.

BRIEF DESCRIPTION OF THE SEVERAL VIEWS OF THE DRAWING

FIG. 4 is a diagram illustrating a relationship between an image area and a non-image area.

FIG. 5 is another diagram illustrating another relationship between the image area and the non-image area.

FIG. 6 is a graph illustrating changes, with respect to time, of a voltage of a signal line 114 and an output voltage of a source follower 105.

FIG. 7 is a graph illustrating change, with respect to time, of a signal current flowing through an effective pixel heat-sensitive part 101, in comparison with that in a prior art method feeding a constant current.

FIG. 8 is a diagram providing a comparison between change in temperature of the effective pixel heat-sensitive part 101 of the present invention and that in prior art.

FIG. 10 is a graph illustrating change, with respect to time, of a voltage-temperature changing rate (dV/dT) of the infrared image sensor of the present invention using nonlinearity of pn junction forward characteristic, in comparison with that of an infrared image sensor of prior art.

DETAILED DESCRIPTION OF THE INVENTION

An infrared image sensor of an embodiment which will now be described has a non-image area having heat-sensitive parts whose temperatures are not raised by infrared radiation made incident through an optical lens and the like, besides an image area having heat-sensitive parts whose temperatures are raised by infrared radiation made incident through the optical lens. The infrared image sensor controls a value of a bias current flowing through the heat-sensitive parts in the image area on the basis of a signal from the heat-sensitive parts of the non-image area, and thereby can suppress fluctuations of a detection signal caused by rise in the temperature due to feeding a bias current. Therefore, it is possible to effectively remove noise components accompanied by change in the temperature of the chip, and improve the reliability.

Further, with rise in the temperatures of the heat-sensitive parts of the non-image area, the value of the bias current flowing through the heat-sensitive part of the image area decreases. Therefore, the voltage-temperature changing rate (dV/dT) in semiconductor pn junction increases, signal-to-noise ratio increases, the sensitivity of the sensor is improved, and its power consumption decreases.

Embodiments of the present invention will now be described with reference to drawings.

(First Embodiment)

Figure 1:
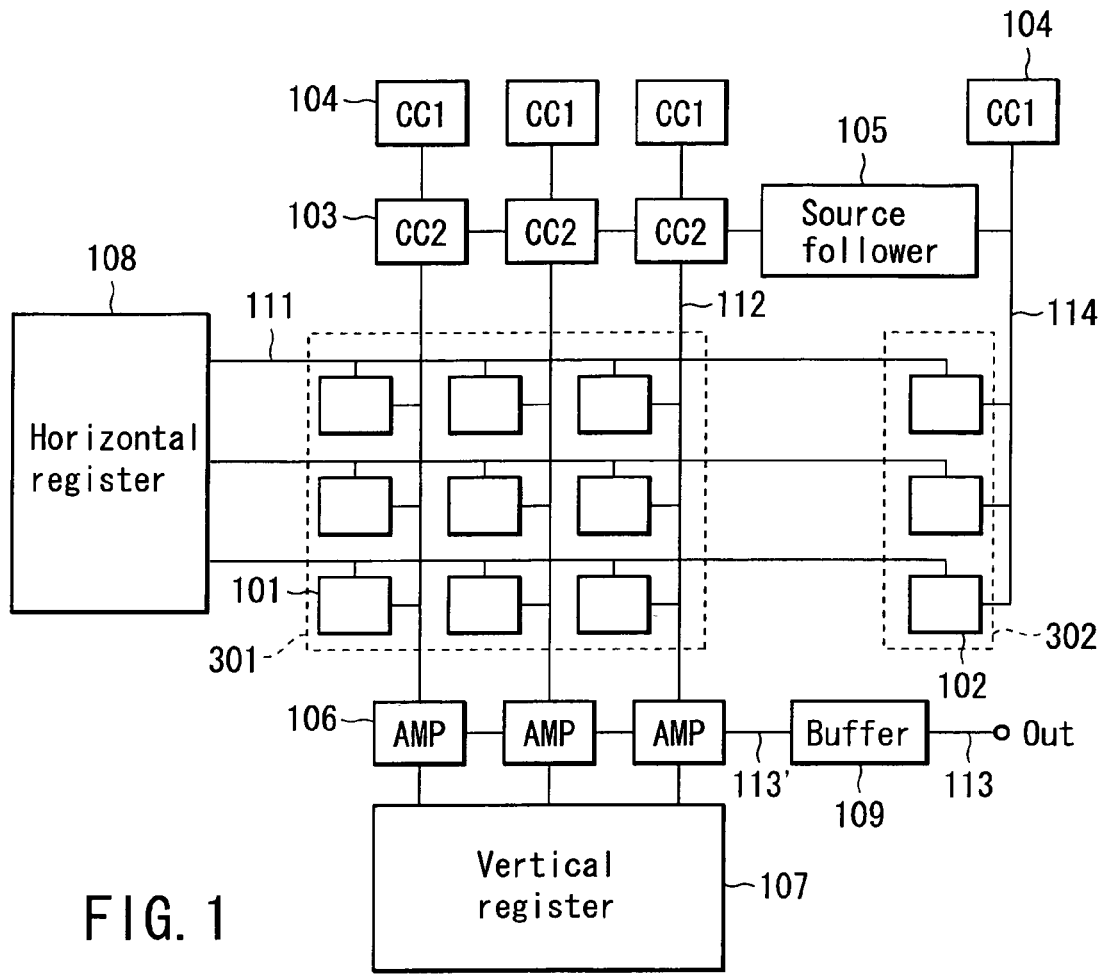
FIG. 1 is a block diagram illustrating a circuit configuration of a heat-sensitive infrared image sensor according to a first embodiment.

FIG. 1 is a block diagram illustrating a circuit configuration of a heat-sensitive infrared image sensor according to a first embodiment of the present invention.

In FIG. 1, reference numeral 101 denotes a heat-sensitive part, which has a structure of absorbing infrared radiation and whose resistance value changes according to heat generated by absorption of infrared radiation. The heat-sensitive parts 101 are arranged in rows and columns extending in an X direction (row direction) and a Y direction (column direction) in an image area on which infrared radiation is made incident. A reference numeral 102 denotes a heat-sensitive part having the same structure as that of the heat-sensitive part 101. The heat-sensitive parts 102 are arranged in a non-image area 302 that is separated from the image area 301 where the heat-sensitive parts 101 are arranged. No infrared radiation is made incident on the non-image area 302.

The heat-sensitive parts 101 in the image area 301 serve as effective pixels, and the heat-sensitive parts 102 in the non-image area 302 serve as reference pixels. Further, the heat-sensitive parts 101 and 102 are arranged adjacent to each other on the same substrate.

Figures 2, 3:
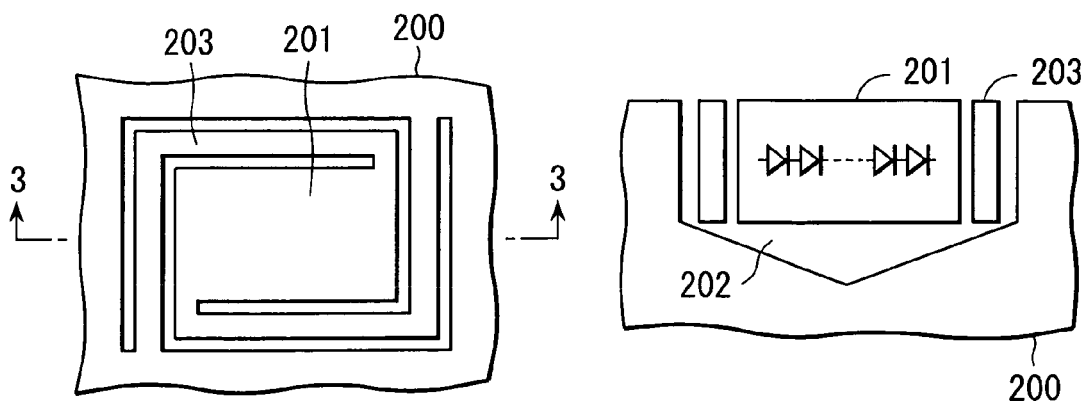
FIG. 2 is a plan view illustrating a structure of a heat-sensitive part.
FIG. 3 is a cross-sectional view of the heat-sensitive part.

As the heat-sensitive parts 101 and 102, used are a semiconductor bolometer which observes rise in the temperature as decrease in the resistance value, or a semiconductor pn junction which observes rise in the temperature as nonlinear decrease in the resistance value. FIG. 2 illustrates an example thereof. A sensor part 201 serving as the heat-sensitive part 101 or 102 includes a pn junction for thermoelectric conversion, as shown in its plan view of FIG. 2 and its cross-sectional view of FIG. 3 taken along line 3—3 in FIG. 2. The sensor part 201 is provided on a hollow-body structure 202 formed inside a monocrystal silicon substrate 200, and hung by support legs 203 having low thermal conductivity.

As described above, it has the structure where the sensor part 201 and the support legs 203 are provided on the hollow-body structure 202 and thereby the temperature of the sensor part 201 is efficiently modulated by incident infrared radiation. Further, to increase the sensitivity, a plurality of thermoelectric converting devices are connected in series in the sensor part 201.

To achieve a structure where infrared radiation is made incident on the image area and not on the non-image area, the structures shown in FIGS. 4 and 5 are adopted. In FIG. 4, the image area 301 is provided in an image-forming plane 305 of an optical lens for condensing infrared radiation, and the non-image area 302 is provided in a position out of the image-forming plane 305 of the optical lens.

In the structure shown in FIG. 5, incident infrared radiation that passed through an optical lens for condensing infrared radiation is directly made incident on the image area 301, and mask 307 shields the non-image area 302 from the infrared radiation. As the mask 307, a shield which covers an area surrounding the image area 301 is provided, and the shield covers the non-image area 302.

To simplify explanation, the drawings illustrate an image area only having a 3×3 pixels structure constituted by 3 columns and 3 rows. The present application is applicable to an m×n pixels structure comprising more columns and more rows, as a matter of course.

A plurality of horizontal address lines 111 are arranged in the row direction through an image region comprising the image area and the non-image area containing the heat-sensitive parts 101 and 102, respectively. The horizontal address lines are connected to the heat-sensitive parts 101 and 102 arranged in the same respective rows as those of the horizontal lines. A plurality of vertical signal lines 112 are arranged in the column direction through the image area. The signal lines 112 are connected to the heat-sensitive parts 101 arranged in the same respective columns as those of the signal lines. A reference vertical signal line 114 is disposed in the column direction through the non-image area, and the heat-sensitive parts 102 arranged in the same column are connected to the signal line.

A horizontal resister circuit 108 is connected with one end of each of the address lines 111, and a bias voltage is successively applied to the address line 111 selected by the circuit 108. By selecting the address line 111, the heat-sensitive parts 101 and 102 connected to the selected address line are selected.

Amplifier circuits (AMP) 106 driven by a vertical register circuit 107 are connected to one ends of the respective signal lines 112 arranged through the image area. A signal amplified by a corresponding amplifier circuit 106 in response to selection by the vertical register circuit 107 is outputted through a buffer circuit 109. The amplifier circuits 106, the vertical register circuit 107 and the buffer circuit 109 form an output circuit.

First current control circuits (CC1) 104 for obtaining a pixel output voltage and second current control circuits (CC2) 103 are connected to the other ends of the respective signal lines 112 arranged through the image area.

A first current control circuit 104 is connected to one end of the signal line 114 of the non-image area. Further, a source follower circuit 105 is provided for controlling the second current control circuits 103 according to the voltage generated on the signal line 114.

In the heat-sensitive infrared image sensor structured as described above, the horizontal register circuit 108 selects a row sequentially, and a fixed bias voltage is applied to the row. A fixed bias current is fed to the effective pixel heat-sensitive part 101 in the image area through the selected horizontal address line 111, and its change in the voltage is outputted to the vertical signal line 112. In this step, the maximum value of the bias current fed to the heat-sensitive part 101 is controlled in a range from 100 nanoamperes to 100 microamperes by the first current control circuit 104. The noise generated at the heat-sensitive part 101 is minimized at the 100 microampere bias current. The maximum value is equal to a value of a current flowing through the reference heat-sensitive part 102. Each of the second current control circuits 103 has approximately the same size as that of each of the current control circuits 104. The source follower circuit 105 applies a control voltage to the second current control circuits 103.

In the meantime, a bias voltage equal to that applied to the effective pixel heat-sensitive part 101 is applied to the reference heat-sensitive part 102 whose temperature does not rise by the infrared radiation which passed through the optical lens, and a bias current equal to that fed to the effective pixel heat-sensitive part 101 is fed thereto. Therefore, the temperature of the reference heat-sensitive part 102 rises only by the bias current, and a voltage signal thereof is generated on the reference vertical signal line 114. The signal is inversed by the source follower circuit 105, and applied to the second current control circuit 103. Thereby, the bias current to be fed to the effective pixel heat-sensitive part 101 is controlled.

Specifically, if the reference heat-sensitive part 102 has no rise in the temperature, the source follower circuit 105 applies a control voltage to the second current control circuit 103, such that a current which is substantially the same as a constant current defined for the first current control circuits 104 is fed. If the temperature of the reference heat-sensitive part 102 has risen, the source-follower circuit 105 changes the control voltage by the value corresponding to the rise in the temperature, and reduces a bias current to be fed to the effective pixel heat-sensitive part 101 by the second current control circuit 103.

In other words, as shown in FIG. 6, when a voltage $V_{114}$ of the reference vertical signal line 114 rises as the temperature of the reference heat-sensitive part 102 rise with the passage of time, an output voltage $V_{105}$ of the source follower circuit 105 decreases. The second current control circuit 103 which has received the output voltage reduces a current to be fed to the effective pixel heat-sensitive part 101. FIG. 7 illustrates a change, with respect to time, of a current flowing through an effective pixel heat-sensitive part 101, in comparison with that in a prior art method feeding a constant current. As shown in FIG. 8, the method of the present invention suppresses rise in the temperature of the effective pixel heat-sensitive part 101 caused by the Joule heat, and enables reduction in fluctuations of detected signal due to the rise in the temperature.

Therefore, the signal existing on the vertical signal lines 112 of the effective pixel is only a signal from outside which has passed through the optical lens and has been absorbed into the heat-sensitive part 101. Thus, noise components generated by the Joule heat due to a bias current are not amplified by the amplifying circuit 106, and only an infrared image signal can be outputted through the buffer circuit 109. As a result, a signal with a good S/N is outputted to the output signal line 113.

Figure 9:
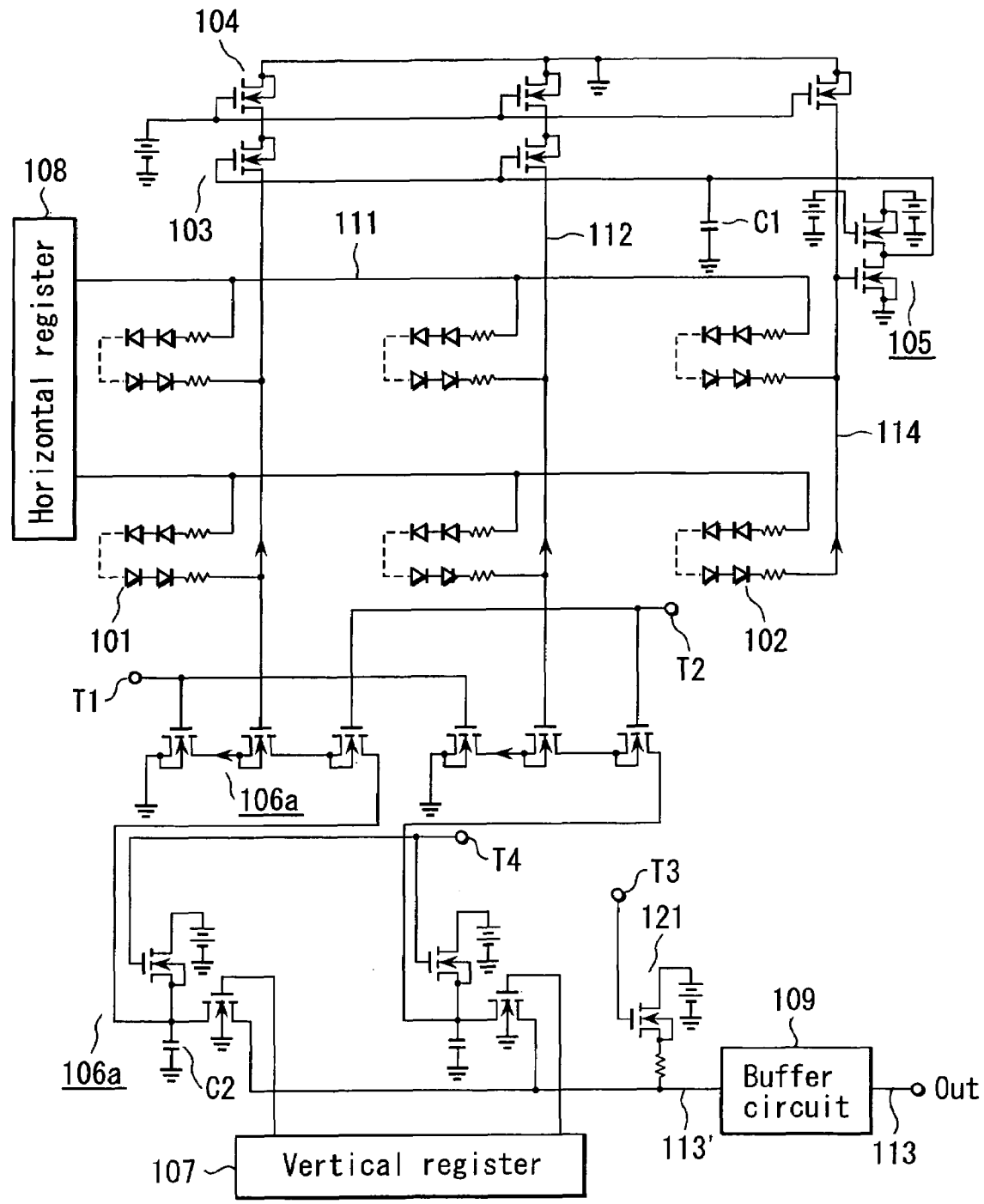
FIG. 9 is a diagram illustrating a specific circuit configuration of the heat-sensitive infrared image sensor according to the first embodiment.

FIG. 9 is a diagram illustrating a specific circuit configuration of the block diagram illustrated in FIG. 1. To facilitate understanding, the same reference numerals are assigned to the same elements as those in FIG. 1. The AMP 106 of FIG. 1 is formed by an element 106a and an element 106b of FIG. 9. In FIG. 9, each of reference numerals T1 to T4 denotes a terminal in which a timing signal is inputted. Reference numeral C1 is a capacitor for holding a control voltage for the second current control circuits 103, and enables continuous display of the previous image even if an input signal to the source follower circuit 105 has stopped. Reference numeral C2 denotes a capacitor for detecting accumulated signals of the effective pixel heat-sensitive part, and reference numeral 121 denotes a reset circuit for setting a potential of a signal line 113' to an initial voltage.

More minutely, each of the heat-sensitive parts 101 and 102 is formed of a plurality of thermoelectric converters connected in series. Each of the thermo-electric converters is expressed as an equivalent circuit comprising diodes and a resistor. A fixed voltage is applied to a gate of each FET serving as the first control circuit 104, and the FET has a fixed impedance. The voltage of the second signal line 114 is inverted by a source follower 105, and applied to a gate of each FET serving as the second control circuit 103. A signal current and a bias current which flow through the heat-sensitive part 101 selected by the horizontal register 108 flows through the signal line 112 to the second and first control circuits 103 and 104 connected to signal line 112. Therefore, when the voltage of the second signal line 114 has risen, the second control circuit 103 operates to reduce the bias current flowing through the signal line 112, such that the potential of the signal line 112 only changes in response to change in the resistance of the heat-sensitive part 101.

The potential of the signal line 112 is provided as a gate potential of an FET in the member 106a forming a part of the amplifier 106. When the timing terminals T1 and T2 have been activated and the terminal T4 has been inactivated, a charge accumulated in advance in the capacitor C2 is discharged. This discharge amount depends on the potential of the signal line 112. After a certain time, a potential corresponding to the signal amount of the signal line 112 sequentially selected by the vertical register 107 is outputted, as a potential of the capacitor C2, to the output terminal Out.

In the circuit configuration, a bias current can be controlled for each line selection, the canceling function works even when the temperature of the chip rapidly changes, such as directly after turning on the power. Further, since a current flowing through the effective pixel is reduced, power consumption of the chip decreases, and it is possible to widely reduce the amount of heat generated from the chip.

As a sensor of the heat-sensitive parts, a bolometer and a semiconductor pn junction which generate change in resistance due to temperature change can be used. In such a case, as described above, the signal voltage is accumulated with the bias current value lowered, thus the voltage-temperature changing rate (dV/dT) increases as shown in FIG. 10, by reason of non-linearity of pn junction forward characteristic. This increases the signal intensity in comparison with the conventional art, which performs driving by a current of a constant value. Although the signal accumulation period can be set at discretion, it is desirable to set the accumulation period at a point after change in the characteristic due to the Joule heat has been stabilized, as shown in FIG. 10.

As described above, according to the above embodiment, the heat-sensitive parts 102 whose temperatures do not rise due to incident infrared radiation made incident through the optical lens and the like are provided, in addition to the heat-sensitive parts 101 whose temperatures are raised due to infrared radiation. The value of the bias current flowing through the heat-sensitive part 101 in the image area is controlled on the basis of a signal from the heat-sensitive part 102, and thereby change in the detected signal caused by rise in the temperature due to the Joule heat can be suppressed. Therefore, it is possible to effectively remove noise components caused by change in the temperature of the chip, and to increase the reliability of the sensor.

(Modification)

The present invention is not limited to the above embodiment. The arrangement of the heat-sensitive parts is not limited to that explained in the embodiment, but the present invention is applicable to various arrangements of the heat-sensitive parts of m (row)×n (column). In such a case, heat-sensitive parts of m×n should be arranged in the image area, and heat-sensitive parts of m×1 are arranged in the non-image area. Further, the heat-sensitive parts arranged in the non-image area is not limited to those of 1 column, but may have 2 or more columns.

The following is an embodiment in which 2 or more columns of heat-sensitive parts are arranged in the non-image area. Specifically, one column of the heat-sensitive parts in the non-image area is used as the reference heat-sensitive parts, and the other columns are used as backup. If only one column of the heat-sensitive parts is used as the reference heat-sensitive parts, there are cases where a part of the heat-sensitive parts of the column is removed in hollowization process (process of forming the hollow-body structure 202) by anisotropic etching for device formation and therefore it is impossible to prevent self-heating of the heat-sensitive parts of the column. Therefore, there is merit in providing other columns for backup. In this case, there should be provided a detecting circuit which detects a signal outputted from the heat-sensitive parts of the column, and further provided a switch circuit which switches, if the signal output of the heat-sensitive parts of the column is judged as being lower than a predetermined value as a result of signal detection by the detecting circuit, to heat-sensitive parts of another column such that the heat-sensitive parts function.

As another embodiment, it is possible to adopt a structure wherein heat-sensitive parts are actually operated column by column and the column of heat-sensitive parts having the highest signal intensity is selected. Selecting a column of heat-sensitive parts having the highest signal intensity enables more accurate control of the bias current and maximizes sensitivity. In this case, there should be provided a detecting circuit which detects signals outputted from the heat-sensitive parts of the columns, and further provided a circuit which selects a column of heat-sensitive parts having the highest signal intensity on the basis of signal detection of the detecting circuit and inputs the signal of the heat-sensitive part of the selected column to the second current control circuit of the above embodiment.

Further, the structure of the heat-sensitive part is not limited to those illustrated in FIGS. 2 and 3, but can be modified according to specifications. Specifically, any structure can be adopted as long as it comprises an infrared radiation absorbing mechanism provided on the semiconductor substrate for absorbing incident infrared radiation and converting it into heat, and thermoelectric converters which converts change in the temperature due to the heat absorbed by the infrared radiation absorbing mechanism into an electrical signal. Further, it is not always necessary to provide a plurality of thermoelectric converters connected in series as the heat-sensitive part. Only one thermoelectric converter can be provided as long as it can obtain a sufficient detection output.

As detailed above, according to the present invention, it is possible to suppress change in the detection signal caused by rise in the temperature of the chip due to a bias current, by controlling the value of the bias current flowing through the heat-sensitive parts in the image area on the basis of a detection signal of the heat-sensitive parts in the non-image area. Therefore, it is possible to effectively remove noise components caused by change in the temperature of the chip, and increase the reliability of the sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An infrared image sensor comprising:
a substrate having an image area on which infrared radiation is made incident, and a non-image area out of the image area;
a plurality of first heat-sensitive parts arranged in columns and rows on the image area of the substrate, each of the plurality of the first heat-sensitive parts having a thermoelectric conversion function of converting a temperature into an electric signal in the state where a bias current is applied thereto, and a structure of absorbing the infrared radiation;
a plurality of second heat-sensitive parts provided in the non-image area of the substrate, the plurality of second heat-sensitive parts provided to correspond to the respective rows and having the same thermoelectric conversion function as that of the first heat-sensitive parts;

a bias current supply circuit which supplies the bias current to the first heat-sensitive parts and the second heat-sensitive parts;

an output circuit which outputs the electric signal of the first heat-sensitive parts; and a bias current control circuit which controls the bias current to be fed to the first heat-sensitive parts, according to an electric signal of the second heat-sensitive parts;

wherein the bias current control circuit is configured to supply the same bias current as fed to the first heat-sensitive parts to the second heat-sensitive parts, and the bias current control circuit comprises, a source follower circuit which inverses the electric signal from the second heat-sensitive parts and outputs an inversed signal; and a control circuit which controls the bias current flowing through the first heat-sensitive parts, with the inversed signal used as a control voltage.

2. An infrared image sensor according to claim 1, the first heat-sensitive parts being arranged in m rows and n columns in the image area, and the second heat-sensitive parts being arranged in m rows and 1 column in the non-image area.

3. An infrared image sensor according to claim 1, the non-image area being provided in a position out of an irradiation area of an optical lens for condensing the infrared radiation on the image area.

4. An infrared image sensor according to claim 1, further comprising a shielding structure which blocks the infrared radiation made incident through the optical lens such that the infrared radiation is not made incident on the non-image area.

5. An infrared image sensor according to claim 1, the thermoelectric conversion function comprising a thermoelectric converter.

6. An infrared image sensor according to claim 5, the thermoelectric converter sensing a rise in temperature as a decrease in resistance.

7. An infrared image sensor according to claim 5, the thermoelectric converter including a semiconductor pnjunction which senses a rise in temperature as a non-linear decrease in resistance.

8. An infrared image sensor according to claim 1, the thermoelectric conversion function comprises a plurality of thermoelectric converters connected in series.

9. An infrared image sensor according to claim 1, each of the first heat-sensitive parts and the second heat-sensitive parts being hung, apart from the substrate, by a low-heat conductor in a hollow-body part provided in the substrate.

10. An infrared image sensor comprising:

a substrate having an image area on which infrared radiation is made incident, and an non-image area out of the image area;

a plurality of first heat-sensitive parts arranged in columns and rows on the image area of the substrate, each of the plurality of the first heat-sensitive parts having a thermoelectric conversion function of converting a temperature into an electric signal in the state where a bias current is applied thereto, and a structure of absorbing the infrared radiation;

a plurality of second heat-sensitive parts provided in the non-image area of the substrate, the plurality of second heat-sensitive parts provided to correspond to the respective rows and having the same thermoelectric conversion function as that of the first heat-sensitive parts;

a plurality of address lines arranged for the respective rows, and connected to the first heat-sensitive parts and the second heat-sensitive parts in the same respective rows;

a plurality of first signal lines arranged for the respective columns, and connected to the first heat-sensitive parts in the same respective columns;

a second signal line connected to the second heat-sensitive parts;

a bias current supply circuit which successively applies a fixed bias voltage to the address lines, and selectively supplies a fixed bias current to the first heat-sensitive parts and the second heat-sensitive parts;

an output circuit which outputs a voltage generated on the first signal lines in the image area as a result of supplying the bias current; and a control circuit which controls the bias current supplied to the first heat-sensitive parts in the image area, on the basis of a voltage generated on the second signal line in the non-image area as a result of supplying the bias current, and suppresses change in a detection signal caused by a rise in temperature of the first heat-sensitive parts due to the bias current.

11. An infrared image sensor according to claim 10, the first heat-sensitive parts being arranged in m rows and n columns in the image area, and the second heat-sensitive parts being arranged in m rows and 1 column in the non-image area.

12. An infrared image sensor according to claim 10, the non-image area being provided in a position out of an irradiation area of an optical lens for condensing the infrared radiation on the image area.

13. An infrared image sensor according to claim 10, further comprising a shielding structure which blocks the infrared radiation made incident through the optical lens such that the infrared radiation is not made incident on the non-image area.

14. An infrared image sensor according to claim 10, the bias current control circuit supplying the same bias current as fed to the first heat-sensitive parts to the second heat-sensitive parts, and the bias current control circuit comprising: a source follower circuit which inverses the electric signal from the second heat-sensitive parts and outputs an inversed signal; and a control circuit which controls the bias current flowing through the first heat-sensitive parts, with the inversed signal used as a control voltage.

15. An infrared image sensor according to claim 10, the thermoelectric conversion function comprising a thermoelectric converter.

16. An infrared image sensor according to claim 15, the thermoelectric converter sensing a rise in temperature as a decrease in resistance.

17. An infrared image sensor according to claim 15, the thermoelectric converter including a semiconductor pn junction which senses a rise in temperature as non-linear decrease in resistance.

18. An infrared image sensor according to claim 10, the thermoelectric conversion function comprises a plurality of thermoelectric converters connected in series.

19. An infrared image sensor according to claim 10, each of the first heat-sensitive parts and the second heat-sensitive parts being hung, apart from the substrate, by a low-heat conductor in a hollow-body part provided in the substrate.

* * * * *